June 5, 1928.  E. C. WOODIN  1,672,594
INTERNAL COMBUSTION ENGINE
Filed April 2, 1925   3 Sheets-Sheet 1
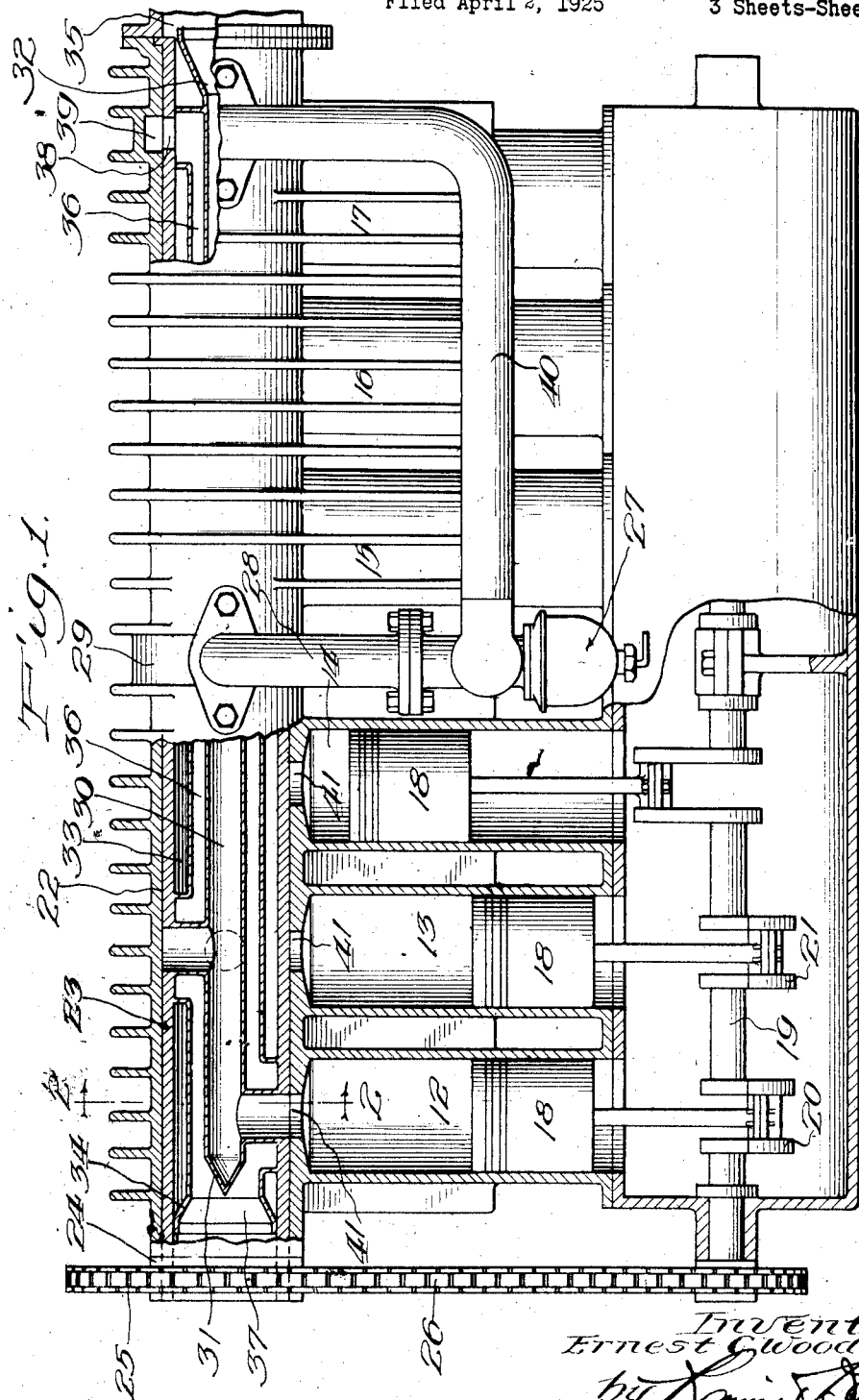

June 5, 1928.
E. C. WOODIN
INTERNAL COMBUSTION ENGINE
Filed April 2, 1925
1,672,594
3 Sheets-Sheet 2
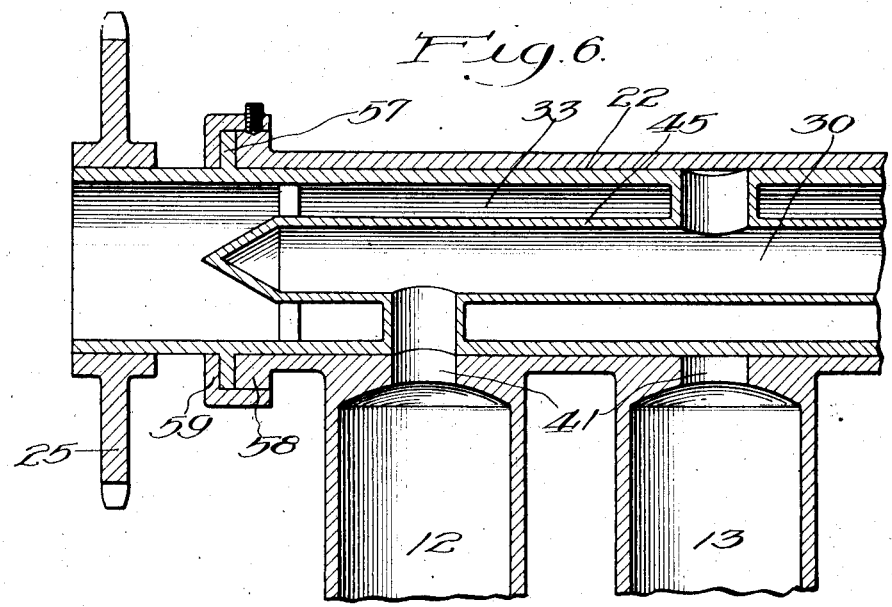
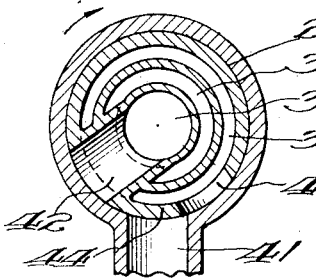
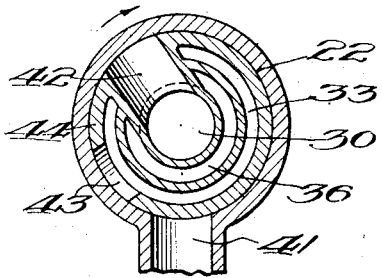
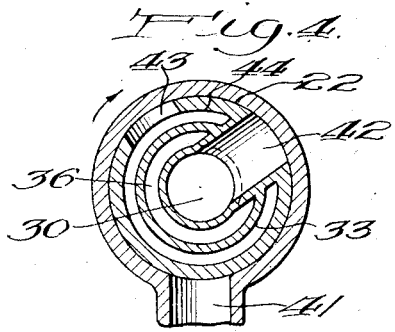
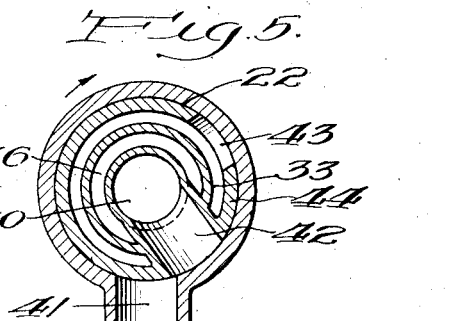

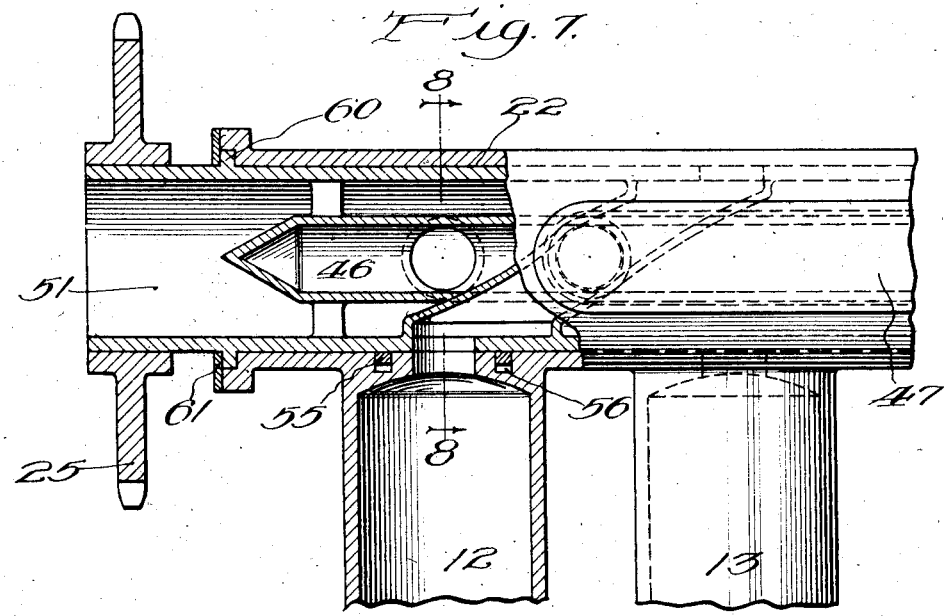
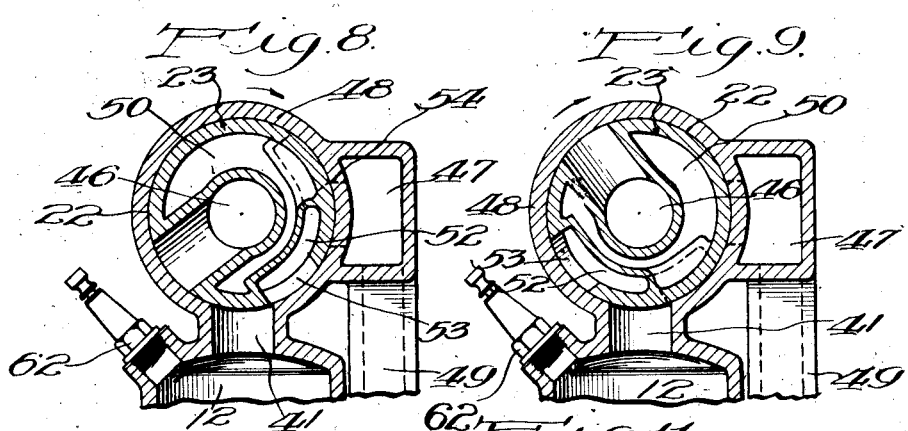
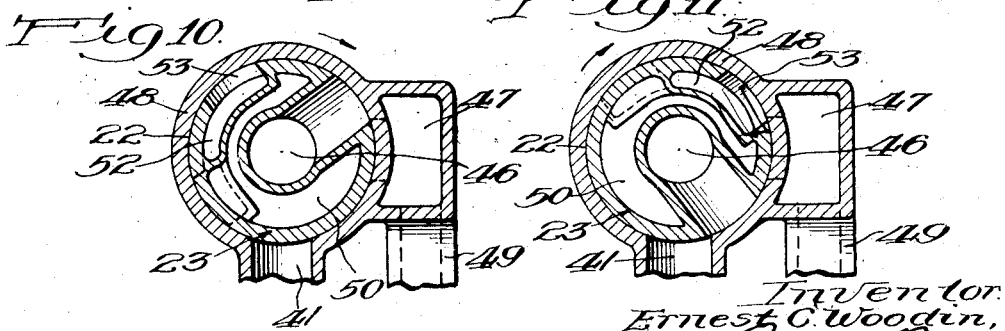

Patented June 5, 1928.

1,672,594

UNITED STATES PATENT OFFICE.

ERNEST C. WOODIN, OF CHICAGO, ILLINOIS.

INTERNAL-COMBUSTION ENGINE.

Application filed April 2, 1925. Serial No. 20,130.

This invention has to do with improvements in internal combustion engines. The invention relates particularly to improvements concerning the valve mechanism for the same.

One feature of the invention relates to the provision of a rotary valve located adjacent to the heads of the cylinders and driven in proper timed relationship to the piston movements. In this connection, it is an object to provide a single rotary valve which shall serve both the intake and exhaust functions. A further object in connection with the above is to provide a single rotary valve serving both of the above functions and operating in conjunction with a single port leading into each cylinder.

A further object in connection with the above is to provide a single rotary valve embodying the above features and so arranged as to serve all of the cylinders of the engine.

A further feature of the invention relates to a valve construction of the foregoing characteristics which is so arranged that ample heat insulating quantity is established between the inlet and exhaust passages thereof so as to avoid excessive transfer of heat to the inlet gases. A further object in connection with the above is to provide means for heating the intake air for the carburetor by means of the exhaust gases while at the same time effectively insulating against excessive heat transfer as already explained.

Still another object is to provide a valve construction of very simple form, one which can be readily cast as a unit, one having relatively few passages and ports therein, and one in which the various passages are of very direct form and short length.

Other objects and uses of the invention will appear from a detailed description of the same, which consists in the features of construction and combinations of parts hereinafter described and claimed.

In the drawings:

Figure 1 shows a side elevation of a typical engine embodying the features of the present invention, approximately one-half thereof being shown in vertical section so as to better illustrate the features of the present invention;

Figs. 2, 3, 4 and 5 show four consecutive valve positions at four consecutive quarter turns of the valve, corresponding to the four strokes of a cycle, all of said sections being taken on the line 2—2 of Fig. 1, looking in the direction of the arrows;

Fig. 6 shows a fragmentary longitudinal section through the upper portions of two cylinders together with a modified construction of valve mechanism;

Fig. 7 shows a view similar to that of Fig. 6, but illustrates another modified form of valve construction; and Figs. 8, 9, 10 and 11 show four consecutive quarter valve positions corresponding to the four strokes of a cycle, all of said sections being taken on the line 8—8 of Fig. 7, looking in the direction of the arrows.

Referring first to Fig. 1, I have illustrated therein a six cylinder machine having the cylinders 12, 13, 14, 15, 16 and 17 within each of which operates a piston 18. The crank shaft 19 is provided with six throws for the six cylinders. Preferably these throws are arranged in pairs, the throws of each pair being at the same angle, so that the pistons perform their up and down movements in pairs, the pistons of each pair traveling up and down together. This fact is clearly evident in Fig. 1 in which the crank throws 20 and 21 for the two cylinders 12 and 13 are at the same angular position, so that both of the pistons in these cylinders work together. This construction is desirable simply for the purpose of bringing the various valve ports into a convenient grouping with respect to each other, but otherwise this arrangement of crank throws is not required as far as the features of the present invention are concerned.

Extending along the upper portion of the structure and adjacent to the cylinder heads is a tabular valve passage 22. The same is conveniently formed as an integral part of the cylinder structure, but in some cases it may be found desirable to place a separate valve housing on the cylinders. Within this valve housing is placed a cylindrical rotary valve designated by the numeral 23. Said valve preferably projects beyond the cylinder blocks at its front end, as shown at 24, so as to receive a sprocket 25 which may be driven by a chain 26 at half speed from the crank shaft 19. In this way the valve is conveniently driven and properly timed.

This valve is provided with longitudinal passages for the intake and waste gases respectively. Preferably these passages are concentrically placed, but in some cases it may be desirable to use a different arrangement. Suitable connections are established for delivering the fresh gas from the carburetor to the intake passage and for delivering the waste gas from its passage to the desired point. Means are also provided for proper communication of the passages respectively and in timed relationship with the cylinders.

In the construction of Fig. 1, the carburetor 27 delivers the mixture through the pipe 28 to an annular passage 29 at the position of the valve housing. The rotary valve 23 is provided with a central axial exhaust passage 30 which is closed at its front end by a partition 31 and is open at its rear end. This axial passage 30 delivers the exhaust gas from the cylinders to the exhaust pipe 35 at its rear end.

Surrounding the exhaust passage 30 is an inlet passage 33 which is closed at its front end by a partition 34. Suitable ports are established between the inlet passage 33 and the annular passage 29.

Between the inlet and exhaust passages there is established a suitable heat insulation so as to prevent excessive heat transfer. In the particular construction of Fig. 1 this is accomplished by a central annular passage 36, the front end of which is open as at 37 to receive fresh air. The rear end of said passage 36 preferably communicates with a series of ports 38 leading to an annular passage 39 in the valve housing, and a pipe 40 extends from the passage 39 to the intake side of the carburetor. With this arrangement the intake air for the carburetor will be preheated and at the same time an effective heat insulation established between the exhaust and intake gases.

In the upper portion of each cylinder and at a position adjacent to the rotary valve is a single port 41, as shown in Fig. 1, the same serving the functions of both inlet and exhaust. In line with each port 41 there is in the rotary valve a radial passage 42 at one angular position communicating with the central exhaust passage 30, and also at another angular position there is an inlet port 43 for each of the ports 41, which inlet port communicates with the inlet passage 33 of the rotary valve. The passage 42 and port 43 for each cylinder port 41 are located at quartering positions, as indicated in Figs. 2, 3, 4 and 5, so that with clockwise rotation, the following sequence of operations is secured:

First the inlet port 43 comes into registry with the port 41 just as the piston passes top dead center. Such registry continues for slightly less than one-fourth revolution of the valve member, namely, until the piston reaches practically bottom dead center. The port 41 is then sealed and remains sealed during the ensuing two piston strokes, namely, the up stroke for compression and the down or working stroke. Promptly thereafter the exhaust port 42 comes into registry with the port 41, so that during the ensuing up stroke the burned gases will be scavenged or expelled from the cylinder.

The ports 42 and 43 should be so timed with respect to the port 41 and with respect to the valve lying between the ports 42 and 43 as to prevent cross communication between the exhaust and inlet ports 42 and 43, respectively, and for this reason a slight amount of lap is provided as shown at 44 in the valve structure.

It will be noted that by placing the crank throws 20 and 21 together in pairs, as indicated in Fig. 1, the corresponding valve ports are located 180° from each other, thus insuring a maximum amount of insurance against any cross communication, and also providing a much more perfectly balanced operation in the valve structure itself. That is to say, the inlet ports for the cylinders 12 and 13, for example, are at opposition, as shown in Fig. 1, and in like manner the exhaust ports for said cylinders are also in opposition to each other.

Referring next to the modified construction shown in Fig. 6, the same is similar to that of Figs. 1 to 5 inclusive with the exception that the intermediate air passage 36 has been eliminated, and there is only a single partition 45 between the exhaust passage 30 and the inlet passage 33. In this case said partition 45 is preferably either made of increased thickness or its heat conductivity is preferably lowered as by lining it on one or both sides with heat insulating material such as asbestos.

In the modified construction shown in Fig. 7 to 11 inclusive, the exhaust passage 46 is similar to those of the previous constructions, but a supplemental inlet passage 47 is provided along one side of the valve housing 48. Said supplemental inlet passage 47 communicates with an inlet pipe 49.

Surrounding the exhaust passage 46 is an air space 50 open at the front end 51, as shown in Fig. 7. Within the valve member itself there is a short inlet passage 52 leading from the inlet port 53 somewhat around the valve and preferably lengthwise thereof to an inlet port 54 leading over to the supplemental inlet passage 47. If desired, each of the passages 52 may extend over far enough to have its other end adjacent to the position of the next cylinder, so that each of said passages 52 may alternately serve two adjacent cylinders.

The construction of Figs. 7 to 11 inclusive, presents in some respect the advantage that the exhaust gases are still farther removed from the inlet gases, so that cross transfer of heat is even more effectively prevented.

In some cases it may be found desirable to provide packing rings around the ports 41. When this is desirable such rings, as shown at 55, may be conveniently placed within circular sockets 56 around said ports 41, as shown in Fig. 7, said rings being forced upwards by light springs within the sockets 56.

Ordinarily a suitable thrust bearings arrangement will be used in conjunction with the rotary valve so as to keep the same properly lined up with respect to the cylinder ports. For example, in the construction of Fig. 6 there is provided a flange 57 on the valve working between the end flange 58 and a removable ring 59 on the cylinder structure; or in Fig. 7 there is provided a flange 60 on the valve working against a removable cover plate 61 on the end of the cylinder structure.

The spark plugs may be located at any convenient point, but the present valve structure is admirably adapted for allowing the spark plugs to be located in the cylinder heads. For example, the spark plug 62, shown in Figs. 8, 9, 10 and 11 may be set in at an angle into the combustion chamber and at a position very close to the port 41.

Manifestly, the engine cylinders and valve housing may be cooled in an manner decided upon by the designer either by air or water or other liquid cooling. In the particular construction shown in the drawings, I have illustrated fins on both the cylinders and valve housing to insure satisfactory air cooling.

While I have herein shown and described only certain embodiments of the features of my present invention, still I do not intend to limit myself to the same, except as I may do so in the claim.

I claim:

The combination with a multiple cylinder internal combustion engine having a crank shaft with its crank throws in pairs at the same angular position, of a cylindrical valve housing for all of the cylinders located adjacent to their cylinder heads, a single port reaching between each cylinder and said housing, a rotary valve rotating within the housing and having a central axial longitudinally extending exhaust gas passage together with a longitudinally extending combustible gas passage encircling the same and an intermediate longitudinally extending annular fresh air passage between the exhaust and combustible gas passages, inlet and exhaust ports in said valve corresponding to each cylinder port and communicating respectively with the combustible gas and exhaust passages of the valve, the inlet and exhaust valve ports for each cylinder port being located substantially at right angles to each other and the inlet and exhaust valve ports for consecutive cylinder ports of each pair being displaced 180 degrees from each other, the longitudinally extending fresh air passage in the valve located between the inlet and exhaust gas passages aforesaid serving to preheat inlet air and reduce transfer of exhaust heat to the inlet gases, an inlet connection for admission of fresh air to said fresh air passage, and a connection from said air passage to the carburetor inlet, together with means for turning said valve at half speed with respect to the crank shaft, substantially as described.

ERNEST C. WOODIN.